H. E. BLAKE.
SAW.
APPLICATION FILED MAR. 22, 1919.

1,334,941.

Patented Mar. 23, 1920.

INVENTOR.
Henry E. Blake
BY Walter E Ward
ATTORNEYS.

UNITED STATES PATENT OFFICE.

HENRY E. BLAKE, OF ELSMERE, NEW YORK, ASSIGNOR OF ONE-THIRD TO DUDLEY P. BABCOCK, OF ALBANY, NEW YORK.

SAW.

1,334,941. Specification of Letters Patent. Patented Mar. 23, 1920.

Application filed March 22, 1919. Serial No. 284,442.

*To all whom it may concern:*

Be it known that I, HENRY E. BLAKE, a citizen of the United States, residing at Elsmere, in the county of Albany and State of New York, have invented certain new and useful Improvements in Saws, of which the following is a specification.

My invention relates to saws and the object of my invention is to construct an improved saw that will be equally useful either as a ripping or as a cross-cut saw and all the teeth of which may be correctly sharpened with the usual "three square" triangular saw files.

I obtain this object by means of a saw with the teeth arranged and shaped as shown in the accompanying drawings in which—

Similar figures refer to similar parts throughout the several views.

In actual practice it has been determined that certain shapes of teeth are best adapted for ripping or working lumber parallel with the grain of the wood, known as ripping teeth, and certain other shapes are best adapted for cutting lumber across the grain of the wood, known as cutting teeth. In my saw I make the teeth in groups of six, as shown in the accompanying drawings as numbers 1, 2, 3, 4, 5 and 6, of which numbers 1 and 2 are designed for cross-cutting purposes. Numbers 4 and 5 are for ripping and numbers 3 and 6, being shaped partly like cutting and partly like ripping or raker teeth. No. 3 is a cutting tooth. No. 6 is a ripping tooth, both being different in form from the other teeth designed to perform the same function, their peculiar forms being the result of having all the notches between all or any adjoining pair of teeth of such shape that a three square file will cut on one side of each tooth during the operation of sharpening the saw, holding and moving the file in forming and sharpening them. The cutting teeth having edges making about equal angles with the longitudinal surface of the saw are sharpened by moving the file back and forth at an angle of about forty-five degrees with the side of the saw. The ripping or raker teeth are formed with the same file but it is held in such a position as to make the front or cutting side of the teeth about at right angles with the longitudinal surface of the saw and the file is moved back and forth at right angles with the side of the saw. One side of numbers 3 and 6 is formed while making cross-cut teeth and the other side while making ripping teeth, as shown in the accompanying drawings.

Figure 2:
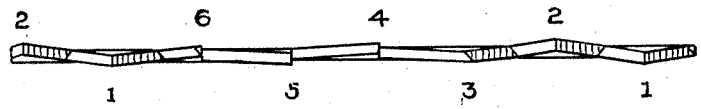
Fig. 2 is a top plan view of my saw showing the edges of the teeth.
Figure 1:
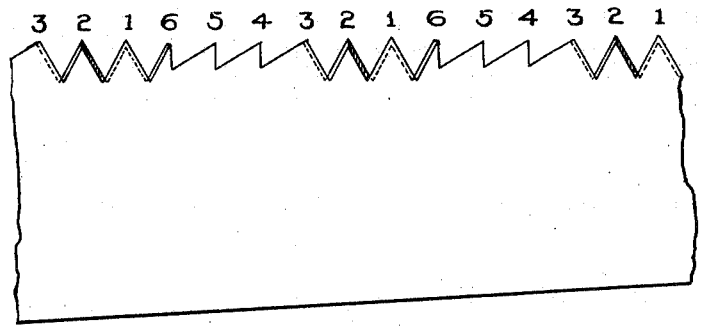
Figure 1 is a side elevation showing the flat surface of a saw with the teeth arranged and shaped according to my invention.
Figure 3:
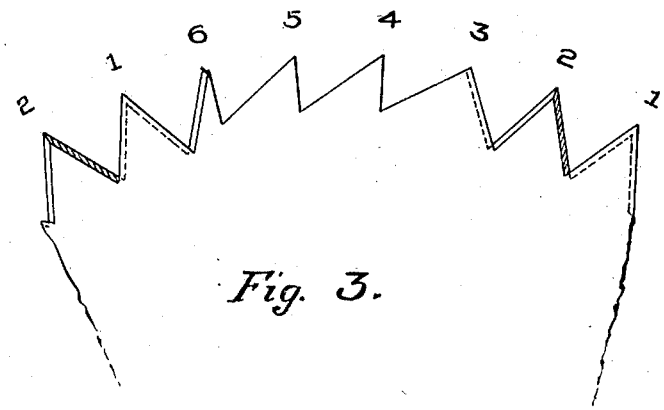
Fig. 3 is a side elevation of a circular saw with the teeth arranged and shaped according to my invention.

The teeth, as shown in the drawings, make a very unsymmetrical system. The object sought to be obtained, however, is to produce a combination of teeth which will satisfactorily do both cross-cutting and ripping so that one saw may do the work of two saws of the usual forms. The device may be applied to circular saws as well as to straight ones, as shown in Fig. 3. The cross-cutting teeth are set in the usual way. The regular ripping teeth and irregular shaped teeth 3 and 6 are formed a trifle shorter than the cutting teeth and are either not set at all or set a trifle less wide than the cutting teeth.

Constructed as hereinbefore shown and described, the saw made up of successive groups of teeth and the groups made up of the combination of shapes of teeth shown, the saw will do the work of a ripping saw and a cross-cut saw so that one saw will do both kinds of cutting, and all the teeth may be properly sharpened by using only the common type of saw files and without the exercise of any unusual skill.

What I claim as my invention and desire to secure by Letters Patent is—

A saw having groups of cutting teeth, alternating with groups of raker teeth having squared faces perpendicular to the cutting edge of the saw, said raker teeth being slightly shorter than said cutting teeth; differently shaped teeth separating the groups, all of the teeth so shaped that one side of each tooth of any adjoining pair of teeth will be properly engaged by a three square file, during the operation of sharpening, substantially as described and for the purposes set forth.

In testimony whereof I have affixed my signature in the presence of two witnesses.

HENRY E. BLAKE.

Witnesses:
WALTER E. WARD,
MINNIE MONTANYE.